(12) United States Patent
Scarfe et al.

(10) Patent No.: US 7,143,442 B2
(45) Date of Patent: Nov. 28, 2006

(54) SYSTEM AND METHOD OF DETECTING EVENTS

(75) Inventors: Richard T Scarfe, Felixstowe (GB); Edmund A. Kirkham, Ipswich (GB)

(73) Assignee: British Telecommunications, London (GB)

( * ) Notice: Subject to any disclaimer, the term of this patent is extended or adjusted under 35 U.S.C. 154(b) by 865 days.

(21) Appl. No.: 10/332,802

(22) PCT Filed: Aug. 2, 2001

(86) PCT No.: PCT/GB01/03450

§ 371 (c)(1),
(2), (4) Date: Jan. 13, 2003

(87) PCT Pub. No.: WO02/15479

PCT Pub. Date: Feb. 21, 2002

(65) Prior Publication Data

US 2004/0103021 A1    May 27, 2004

(30) Foreign Application Priority Data

Aug. 11, 2000 (EP) ................................. 00306876

(51) Int. Cl.
*G06F 11/00* (2006.01)
*G06F 9/00* (2006.01)
*G06F 11/22* (2006.01)
*G06F 11/30* (2006.01)
*G06F 11/32* (2006.01)
*G06F 11/34* (2006.01)
*G08B 23/00* (2006.01)

(52) U.S. Cl. .............................. 726/23; 726/11; 726/25
(58) Field of Classification Search .................... None
See application file for complete search history.

(56) References Cited

U.S. PATENT DOCUMENTS 6,304,262 B1 * 10/2001 Maloney et al. ............ 345/418

FOREIGN PATENT DOCUMENTS

| WO | WO 00/05842 | 2/2000 |
| WO | WO 00/16529 | 3/2000 |

* cited by examiner

*Primary Examiner*—Gilberto Barron, Jr.
*Assistant Examiner*—Krisin D. Sandoval
(74) *Attorney, Agent, or Firm*—Nixon & Vanderhye P.C.

(57) ABSTRACT

Apparatus for classifying network traffic events in accordance with one or more conditions includes a categorizer for categorizing a plurality of network traffic events, an analyzer for analyzing at least one aspect of the network traffic events and identifying groups in accordance with the analysis; a structure for determining group allocation for the categorized network traffic events, a generator for generating one or more conditions in relation to the group and category of analyzed network traffic events, and a classifier for classifying a newly detected network traffic event in accordance with the one or more conditions generated.

18 Claims, 8 Drawing Sheets

| IP Address | Past 24 hours | Current cluster | Description of cluster change |
|---|---|---|---|
| 209.40.100.150 | GGGGGCGGGGGGC | G | ICMP SENDER->LARGE RECEIVER |
| 147.151.166.143 | EEEEEEEEEEEEE | G | HTTP SENDER->LARGE RECEIVER |
| 212.108.4.176 | ZZZZZZFBFFFFFF | D | BIG SENDER->FTP+TELNET SENDER |
| 147.150.67.113 | FFFDFFFFFFFFFD | B | FTP+TELNET SENDER->BIG SENDER |

Fig 8

SYSTEM AND METHOD OF DETECTING EVENTS

This application is the US national phase of international application PCT/GB01/03450 filed 2 Aug. 2001 which designated the U.S.

BACKGROUND OF THE INVENTION

1. Technical Field

The present invention is concerned with a system and method of detecting events, and is suitable particularly for detecting uncommon behaviour of network devices by firewall systems.

2. Related Art

A firewall system controls access to or from a protected network (e.g. a Local Area Network (LAN)). It implements a network access policy by forcing connections to pass through the firewall, where they can be examined and evaluated. If all access to and from the Internet passes through a firewall, the firewall can log accesses and provide valuable statistics about network usage. A firewall, with appropriate alarms that sound when suspicious activity occurs can also provide details on whether the firewall and network are being probed or attacked. Commonly network usage statistics and evidence of probing is logged for a number of reasons. It is essential to know whether the firewall is withstanding probes and attacks, and whether the controls on the firewall are adequate.

Conventional firewall systems make use of high-speed filtering mechanisms, which are used to block datagrams according to predetermined rules. These rules specify lists of services that should be blocked, and are implemented according to a Security Policy. The owner of a private network behind the firewall system typically specifies Security Policies, which reflect a balance between a business need to access certain external services on the one hand, and a need to minimise unauthorised attacks on their internal systems on the other hand. If a packet falls foul of one of the firewall rules and is dropped, ostensibly this fulfils the Security needs of the business behind the firewall; however, the types and patterns of attacks may change in such a way that they manage to bypass the controls in the Security Policy.

Typically, all of the traffic that arrives at the firewall system is logged in a firewall log. Extremely useful information about types of attacks and sources of attacks can be gleaned from monitoring and analysing all incoming traffic, and it is common to install a firewall probe in communication with the firewall log. The firewall probe looks for predetermined sequences—e.g. a plurality of attempts to access a certain port, which requires password authentication; attempts to access certain ports that are known to be reserved for sensitive functionality etc. One of the problems with the firewall probe is that the sequences it looks for are determined by the experience, skill and judgement of a firewall administrator, because the types and patterns of attacks that are placed on a firewall change at a rapid pace. The functionality of a firewall probe is thus largely driven by a reaction to known attacking methods, and cannot, at present, be captured in an algorithmic manner.

If the behaviour of incoming traffic falls within one of these predetermined sequences, an alert signal is generated, which is presented to a firewall operator, together with certain details pertaining to the packet(s) associated with the alert. The firewall operator then decides what action should be taken. For firewall systems receiving a lot of traffic, a firewall operator may be faced with many alerts—the majority of which are not hacking attempts, but could be configuration problems (e.g. a new device has been installed on the private network, but the Security Policy has not been updated to include access to that device). On a psychological level, the attention span of a human, when faced with multiple screens of messages (data), can be limited. Furthermore, when a considerable number of these messages are infrastructure-related, rather than security-related, the attentiveness and motivation of the operator may diminish further still. Thus, any means of automating this process, and reducing the need to involve humans would be of great benefit.

BRIEF SUMMARY

According to a first aspect of the invention there is provided a method of analyzing network events. According to a second aspect of the invention there is provided apparatus for analyzing network events.

Preferably the apparatus may include means for determining a frequency of occurrence of each possible pair of group allocations, such that pairs that occur with a frequency below a predetermined frequency threshold are classified as rare pairs. The apparatus may further include means for comparing rare pairs with pairs of groups allocated to newly detected network traffic events, and for generating an alert if groups corresponding to newly detected network traffic events fall within the rare pairs. Thus, when the apparatus is in operative association with a firewall system, such an alert can conveniently be output to the firewall system.

Glossary:

In the following description, the terms firewall data, field, principal component, factor, factor expression, cluster pairing, IP address cluster are used. These are defined as follows:

"firewall data": data, for instance packets, that are received at a firewall component, such as a router or a server machine, and are recorded, for instance by being written to a firewall log;

"field": structured data, such as packets arriving at the firewall component are analysed for administrative information, and this information is saved in the firewall log. This information (such as date of arrival of packet, time of arrival of packet, action performed by firewall wrt the packet, interface packet received on, transport layer protocol corresponding to packet, source IP address of packet, destination IP address of packet, packet length, etc.) is then translated into fields, each of which describes a single characteristic of an IP address: protocol type being sent or received (FTP, Telnet, HTTP, ICMP, TCP etc.), number of packets being sent or received etc. (see Table 1 in Annex 1 and description below);

"principal component": if an entity is described by a plurality of characteristics, e.g. the human body can be described by arm length, shoe size, inner leg length, crown diameter etc, it is likely that there is correlation between some of those characteristics. If there is correlation between some characteristics, then these correlated characteristics may be reduced to fewer principal components—e.g. the length of arm may be directly related to length of upper body, which means that rather than describing the upper part of a human body by both the arm length and upper body length, a single component can be used (the single component comprising components from both upper body and arm length).

Thus extracting the principal components of an entity reduces the number of components by which the entity can be described;

"factors": the principal components for firewall data;

"factor expression": an expression which describes all of the factors that are significant to an IP address: e.g. IP address 0.0.0.2 has factor expression $\alpha F_1 + \beta F_2 + \gamma F_3$ etc, where $\alpha, \beta, \gamma$ are coefficients that represent relative contributions from each of the factors;

"IP address cluster": a cluster of IP addresses correlated by common factors;

"cluster pairing": a pair of clusters.

The above terms are defined in the context of IP data (e.g. packets, TELNET, FTP etc. protocol); however, data could be transmitted according to different network protocols, in which case the data would be described in the context of the appropriate network protocol (e.g. ATM—data is transmitted in cells).

BRIEF DESCRIPTION OF THE DRAWINGS

Further aspects, features and advantages of the method and apparatus of detecting uncommon events will now be described, by way of example only, as an embodiment of the present invention, and with reference to the accompanying drawings, in which.

DETAILED DESCRIPTION OF EXEMPLARY EMBODIMENTS

Overview

Figure 1:
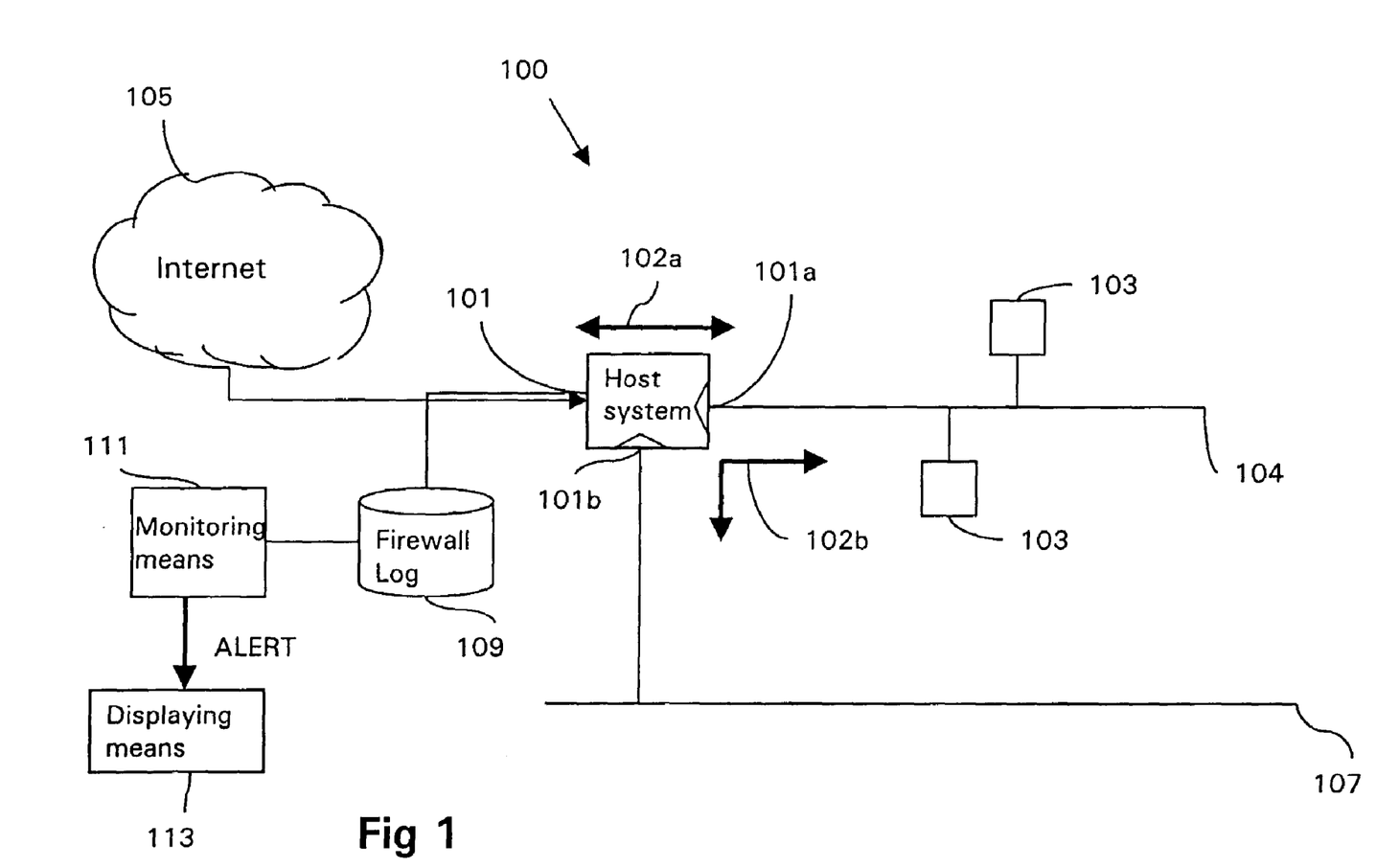
FIG. 1 is a schematic diagram showing a firewall configuration comprising a dual-homed gateway firewall.

FIG. 1 shows a schematic diagram of a typical firewall configuration 100, known as a dual-homed gateway system, connected to the Internet 105 on one side, and to a private network 107 on the other side. The firewall configuration 100 comprises a host system 101 with two network interfaces 101a, 101b, where the host's IP forwarding capability is disabled (i.e., the default condition is that the host cannot route packets between the two connected networks 105, 107). The host system 101 allows Internet traffic, as indicated by direction arrow 102a via first interface 101a, onto a gateway 104 according to a first set of predetermined rules. The flow of traffic into the private network 107 (via a second interface 101b) is controlled according to a second predetermined set of rules, as indicated by direction arrow 102b. These rules typically specify predetermined actions in respect of types of packets, and include either allowing packets to pass through the respective interfaces 101a, 101b, or dropping the packets. The rules are implemented in accordance with a Security Policy associated with the private network 107.

Proxy servers 103 on the gateway 104 provide services, such as TELNET, FTP and e-mail etc., and in the case of e-mail, the host system 101 typically accepts all site mail and then forwards it to the private network 107 via the second interface 101b. The firewall system 100 can also log access and attempts to probe the private network 107 (and indeed the host system 101 itself) via a firewall log 109. The firewall log 109 is in communication with monitoring means 111, which continually checks for occurrences of predetermined sequences of actions, and generates an alert 112 if incoming traffic falls within any of these sequences of actions. This alert is received by displaying means 113. Displaying means 113 is preferably located remote from the firewall system 100, for example on a different sub-net, such that the alerts are sent over the network. In this way, a business that manages several different firewall systems can monitor activity on all of the firewall systems at a central location. Alternatively, for example, if there is only one firewall system to be monitored, displaying means 113 could be located on the same sub-net as the firewall system 100.

Typically, a system administrator, according to his skill, knowledge and expertise, configures the rules associated with the predetermined sequences, and a firewall operator reviews any associated alerts displayed on displaying means 113. These rules often err on the side of extreme vigilance, and can result in a vast number of alert messages being generated. This can create a cognitive overload on the firewall operator, who cannot efficiently follow up, or even be aware all of the alert messages displayed to him.

Overview of Rare Event Detector 201

Figure 2:
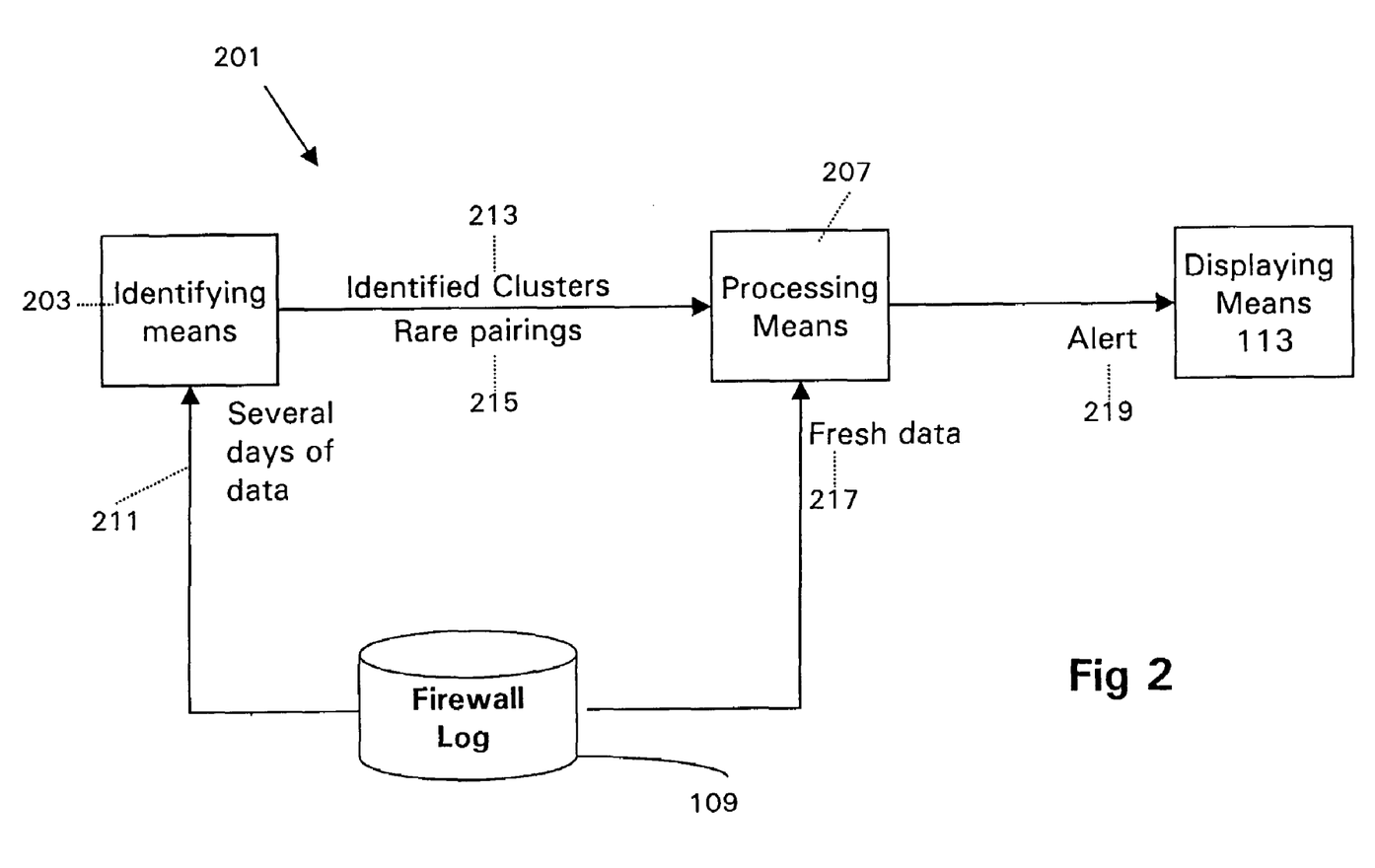
FIG. 2 is a schematic block diagram of apparatus for detecting uncommon events according to an embodiment of the invention.

As shown in FIG. 2, the rare event detector 201 comprises two parts, identifying means 203 for identifying rare event criteria and processing means 207 for processing data in accordance with the rare event criteria. The identifying means 203 operates off-line, on data that has been collected previously in the firewall log 109, and identifies criteria that characterises rare IP address events. The processing means 207 receives fresh data 217 from the firewall log, and applies the rare event criteria established by the identifying means 203 to examine incoming IP packets, thereby identifying any IP addresses that fall within the identified criteria.

Figure 3:
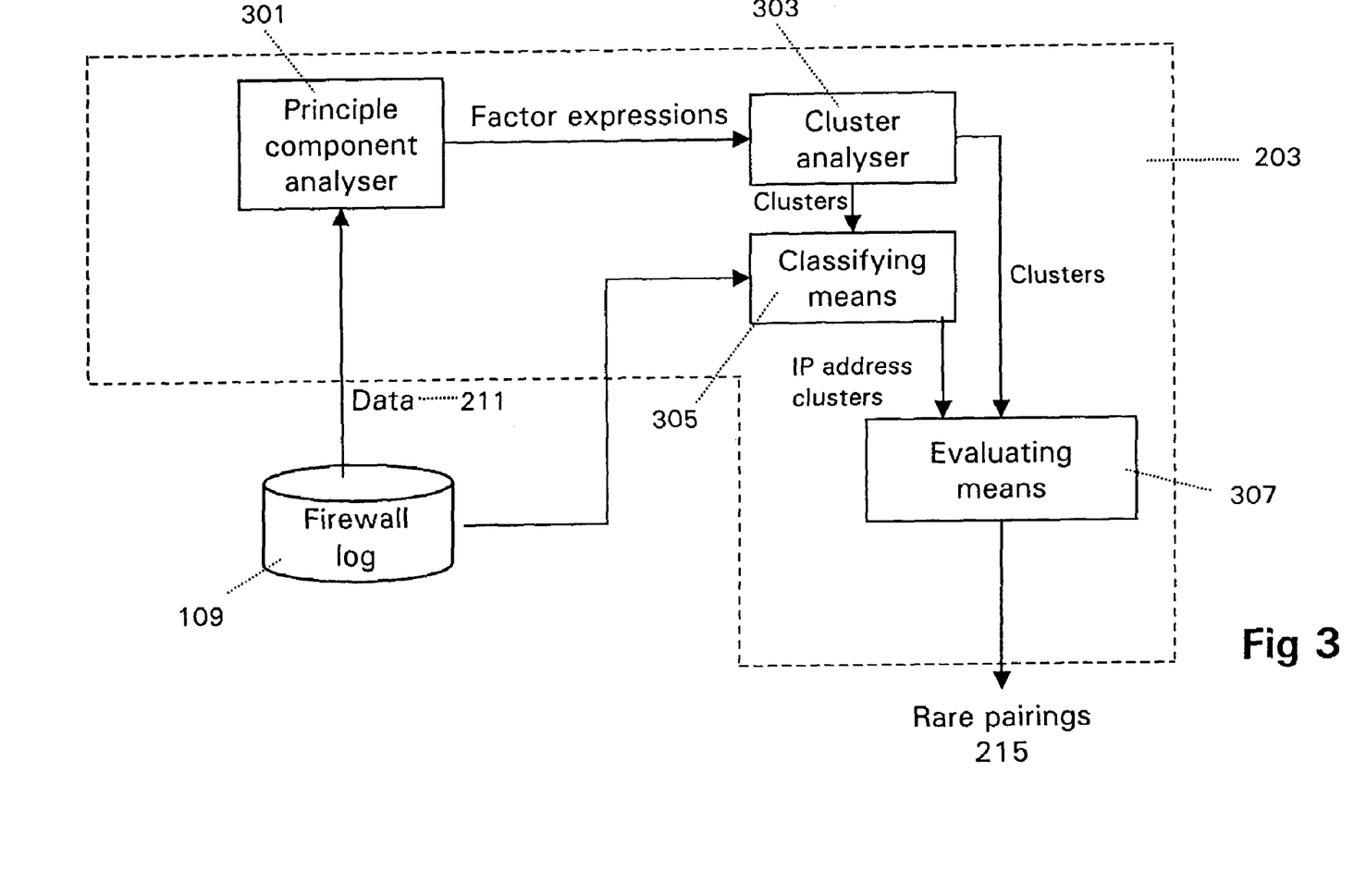
FIG. 3 is a schematic block diagram showing components of identifying means forming part of the apparatus for detecting uncommon events of FIG. 2.

The identifying means 203 includes categorising means for categorising network traffic events into IP addresses, analysing means for analysing at least one aspect of the network traffic events, such as type and destination of traffic event, and identifying clusters. The functionality of the categorising and analysing means could be, for example, realised by a Principal Component Analyser 301 in conjunction with a cluster analyser 303 (described in more detail below). The identifying means 203 also includes group determining means for determining group, or cluster allocation, for the IP addresses, and generating means for generating one or more conditions in relation to the clusters. The functionality of the group determining and generating means could be realised by classifying means 305 in conjunction with evaluating means 307, described in more detail below. The processing means 207 includes classifying means for classifying a newly detected network traffic event in accordance with the one or more conditions generated.

In operation, the identifying means 203 receives data 211, typically several days of data, from the firewall log 109. This data 211 comprises data from IP packets that have been seen by the firewall 100 and includes information such as source and destination IP addresses, ports, types of protocol associated with the packets, time packet was received at firewall etc. The identifying means 203 categorises a predetermined amount of firewall data 211 into IP addresses, and uses this categorised data to identify clusters 213 characterising the data, and then classifies each IP address in the firewall log 109, as a function of time, into one of the clusters 213. The classification of IP address includes assigning a cluster and time period to each IP address, where the time period is preferably an integer value given by time that the IP address was registered in the firewall log 109 divided by a predetermined time scale. For each IP address, the identifying means 203 then analyses changes in cluster classification between successive time periods, thereby grouping cluster classifications into consecutive cluster pairs, and, for each possible cluster pairing, calculates the frequency with which pairs of clusters are observed. Cluster pairings that occur at frequencies below a predetermined threshold are identified as rare pairings 215, and are input to the processing means 207. The identified clusters 213 are also input to the processing means 207.

As shown in FIG. 2, processing means 207 receives as input rare pairings 215, identified clusters 213, and fresh data 217 from the firewall log 109. Fresh data 217 is sent from the firewall log 109 at predetermined intervals, or time periods. The processing means 207 analyses the fresh data 217 using the identified clusters 213 to determine a cluster classification for the fresh data 217, and, using similarly derived cluster classifications from the previous time period, generates cluster pairings for the previous and present time periods for each IP address. These cluster pairings are compared with the rare pairings 215, and if a cluster pairing is one of the rare pairings 215, an alert 219 is generated. This alert 219 is sent to the displaying means 113, shown in FIG. 1, along with the IP address corresponding to that cluster pair.

Thus the rare event detector 201 identifies IP addresses exhibiting unexpected changes in behaviour, independent of any static rules with respect to ports, protocols or types of attacks.

Identifying Means 203 for Identifying Rare Event Criteria

As shown in FIG. 3, the identifying means 203 comprises Principal Component Analyser (PCA) 301, cluster analyser 303, classifying means 305, and evaluating means 307. The identifying means 203 operates off-line, while a firewall system 100 is being configured; when the firewall is in operation, the processing means 207 is used to analyse incoming packet data. Thereafter identifying means 203 is used to periodically check on factors and clusters.

Figure 4:
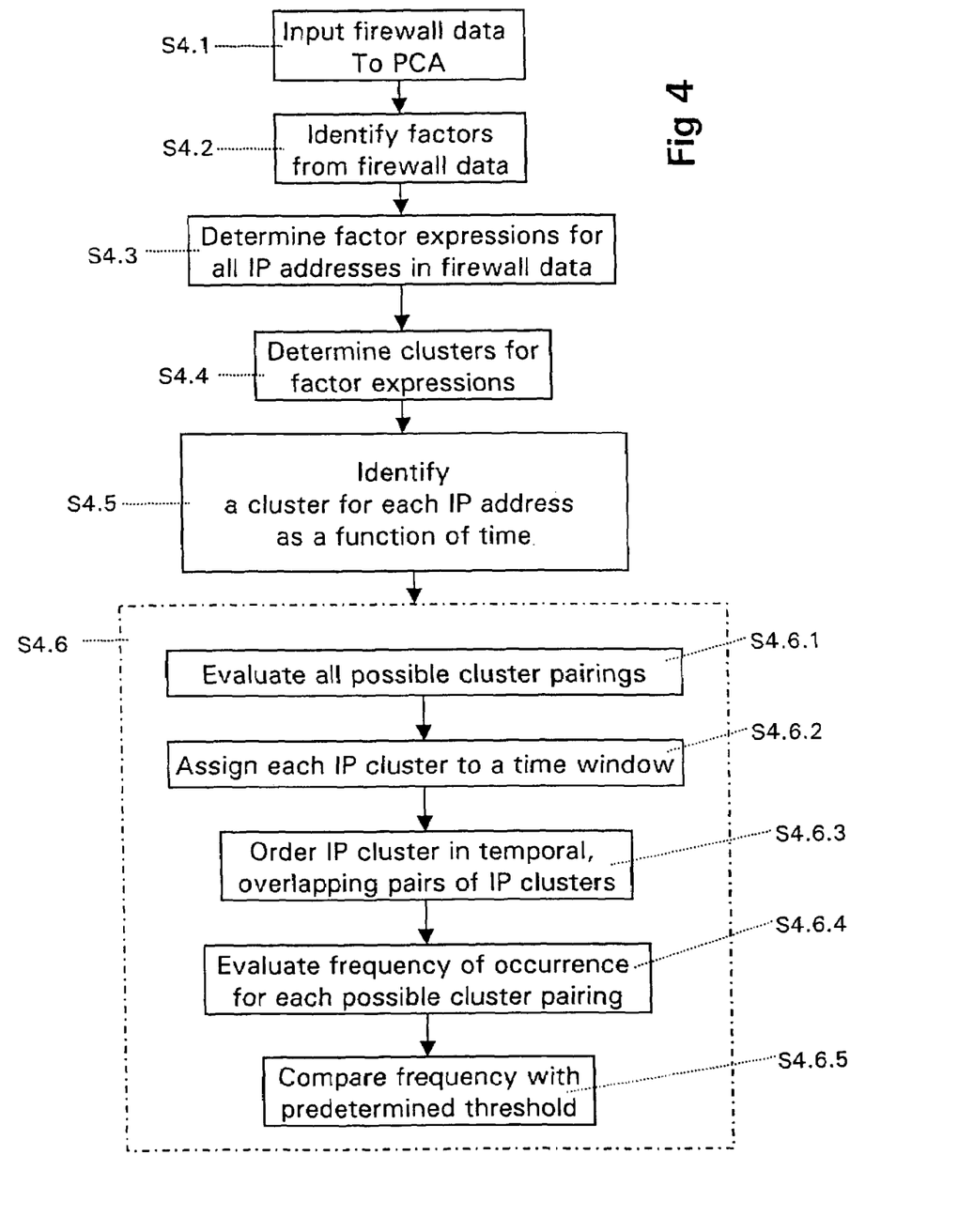
FIG. 4 is a flow diagram showing the processes carried out by components of the identifying means of FIG. 3.

These components interoperate as shown in FIG. 4:

S 4.1 Firewall data 211, which comprises received packets characterised by a plurality of fields, is input to PCA 301;

S 4.2 PCA 301 identifies principal components, known as factors, from the firewall data 211. Identifying the factors could be performed by one of ordinary skill in the art. In order to capture all types of behaviour possible, there is a supposition that the factors correctly describe a particular type of behaviour, and that the factors are sufficiently up to date to be able to describe all possible types of behaviour; thus the factors require to be reviewed on a regular basis.

Figure 5:
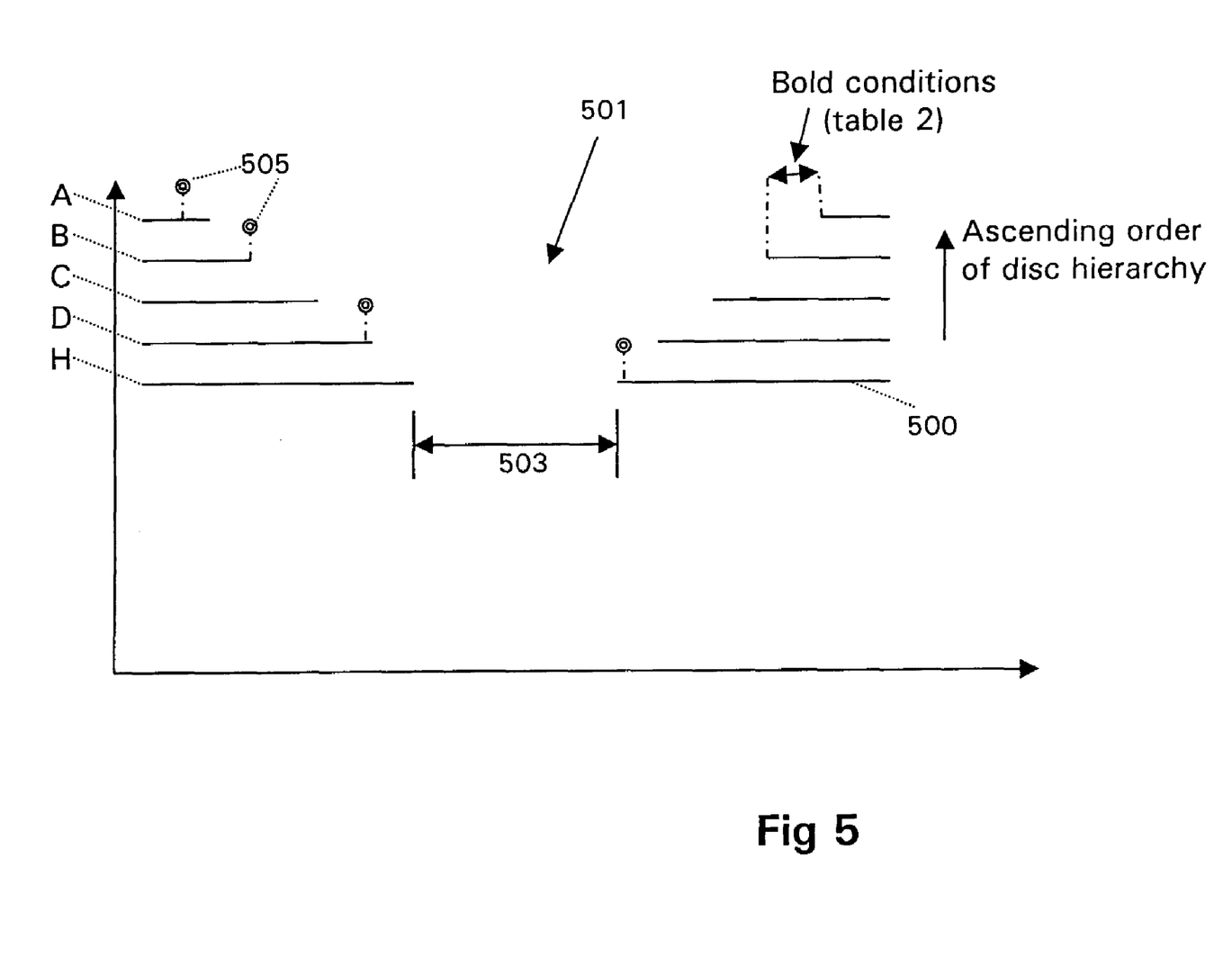
FIG. 5 is a two-dimensional representation of clusters determined by one of the components of the identifying means of FIG. 3.

Each factor comprises a contribution from a combination of fields, such that any one factor typically comprises varying contributions from several fields. Table 1 (see Annex 1) maps the relationship between the fields and the factors for a particular set of firewall data. The PCA 301 is preferably part of an industry standard statistics package, known as "SAS" licensed from SAS Institute Inc, which includes a facility for extracting principal components from a data set having a plurality of characterising components. For further information, contact the SAS Institute at Technical Support Division SAS Institute Inc. SAS Campus Drive Cary, N.C. 7513-2414, or refer to http://www.sas.com/corporate/index.html;

S 4.3 PCA 301 determines factor expressions for all IP addresses in the firewall data 211. Note that if, during a time period in which an IP address is analysed, it is both sending and receiving packets, and is using different protocols, the factor expression for that IP address is likely to comprise contributions from more than one factor;

S 4.4 Cluster analyser 303 receives the factor expressions, and, for a statistically representative sample of IP addresses selected at random from the firewall data 211, determines clusters that characterise the factor expressions. Note that if the behaviour of a significant number of IP addresses is characterised by more than one factor, then the clusters could be expected to comprise contributions from more than one factor, as shown in Table 2 (Annex 1). There are many types of clustering techniques (alternatives are described briefly in the "alternatives" section below); in this embodiment the analysed IP addresses are plotted in factor-space, and the factor-space is chopped into N non-overlapping clusters (chopping and N determined by the spread of values). In this way, each IP address falls into one cluster only;

S 4.5 Each IP address in the randomly selected sample is input to classifying means 305 and classified within one of the clusters. The mechanism by which clusters classify the IP addresses is best explained with reference to FIG. 5. Each IP address to be classified can be represented as a data point in factor space (in this case 8 dimensional space), which can alternatively be represented in 2-dimensional space, as is shown in FIG. 5. In the 2 dimensional representation, each cluster A–H can be visualised as a disc 500, shown in cross-section in FIG. 5, having a hole in the middle 501, each disc having a different sized inner diameter 503, compared to any of the other discs. Each IP address thus occupies a point 505 in the 2-dimensional space, and this position is either vertically aligned (as indicated by the dotted line from points 505) with the disc of a single cluster or it lines up with the hole of the smallest inner diameter disc (cluster H). IP addresses that fall through the hole 501 of cluster H are classified in cluster N (normal). The disc, and thus cluster, with which an IP address is vertically aligned defines the classification of an IP address. One of the fields accompanying firewall data is time of receipt of packets at the firewall, and this enables each packet pertaining to an IP address to be defined by cluster and time;

S 4.6 Clusters determined at S 4.4 and IP address clusters classified at S 4.5 are input to evaluating means 307, which performs the following steps:

S 4.6.1 Evaluate all possible cluster pairings, and the total number of possible cluster pairings e.g. if S 4.4 has identified 10 clusters—A, B, C, D, E, F, G, H, N, Z (where Z signifies that all factors are zero, i.e. no data has been received for an IP address (see Table 2, Annex 1)—then the number of possible pairings=$10^2$;

S 4.6.2 Assign each IP address cluster to a time window, $$TW_{IPaddress} = int\left(\frac{t_{IPaddress}}{\Delta t}\right),$$

where TW is time window corresponding to $t_{Ipaddress}$. $t_{Ipaddress}$ is time that the packet corresponding to IP address was recorded in the firewall log, and t is the granularity of the time window. For a data set comprising 36 hours of data, t is preferably 2 hours;

S 4.6.3 For each IP address, order the IP address clusters in successively classified, or temporally overlapping, pairs: i.e. pair up clusters pertaining to IP address 0.0.0.2 at time window 0, 1 and 1, 2 and 2, 3 and 3, 4 etc. . . . so as to produce pairings of the form:

TABLE 3

| IP address | Time window | Cluster pairing |
|---|---|---|
| 0.0.0.2 | 0, 1 | A, B |
|  | 1, 2 | B, B |
|  | 2, 3 | B, B |
|  | 3, 4 | B, C |
| etc. |  |  |

S 4.6.4 Evaluate how many times each of the possible pairings occur (independent of IP address, or time window in which they occur), and determine this occurrence as a fraction of the total number of possible cluster pairs. e.g. for 36 hours of data, there are 35 possible pairs; for 10 clusters there are 100 possible cluster pairings. Thus for 100 000 IP addresses recorded in the firewall data 211, total number of cluster pairs=35×100×100 000=3.5 million, and $$Occurrence(C_iC_j) = \frac{\sum_{i=0,10;j=0,10} C_iC_j}{3.5 \text{ mill}}$$

where $C_iC_j$ denotes occurrence of cluster pair $C_i$ followed by $C_j$.

S 4.6.5 Pairs $C_iC_j$ that occur with a frequency below a predetermined threshold, are categorised as rare pairings 215.

Figure 6:
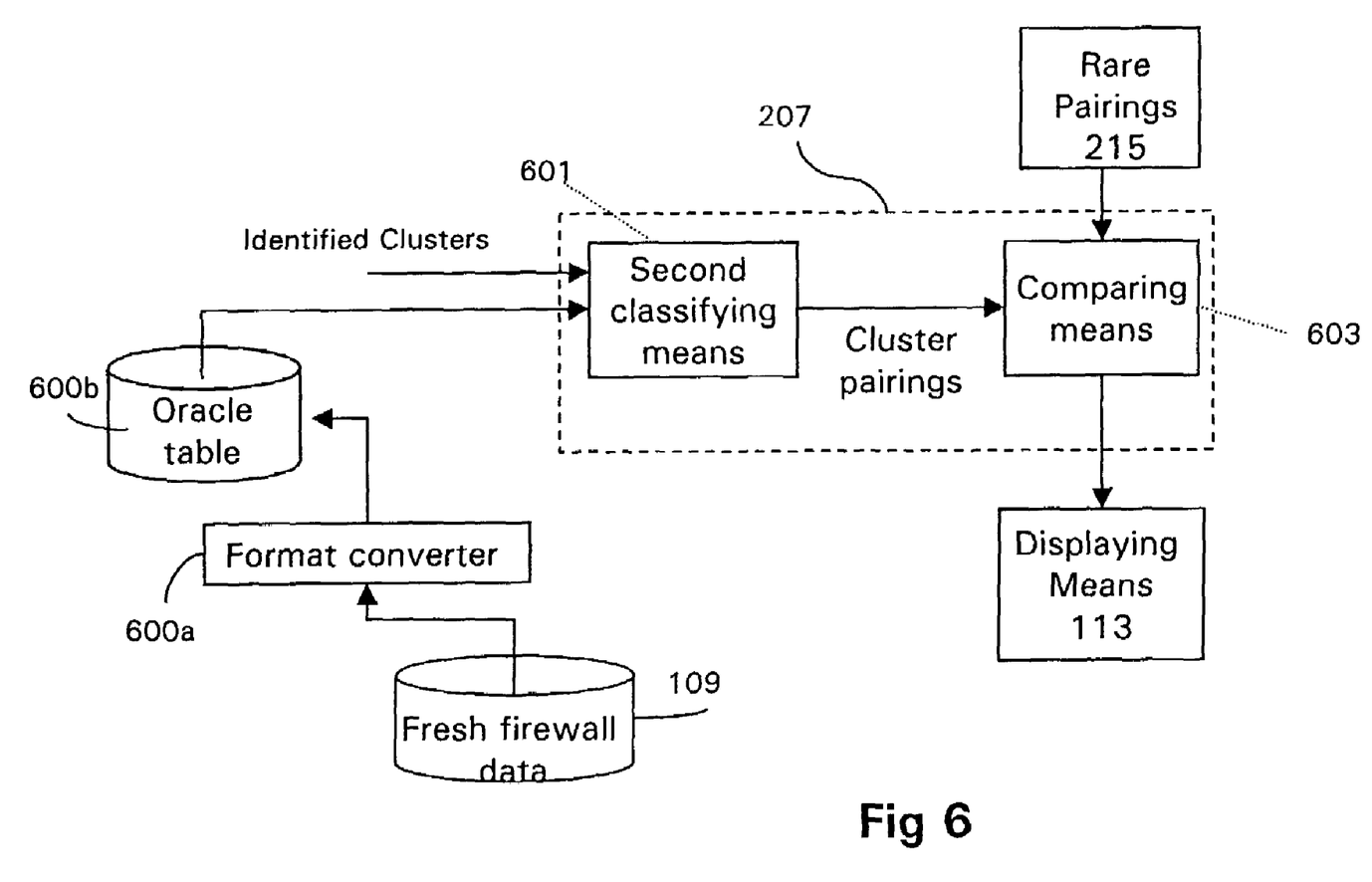
FIG. 6 is a schematic block diagram showing components of processing means forming part of the apparatus for detecting uncommon events of FIG. 2.

Processing Means 207 for Processing Data in Accordance with the Rare Event Criteria In terms of the firewall system presented in FIG. 1, the processing means 207 could replace, or work in parallel with the monitoring means 111. As shown in FIG. 6, the processing means 207 comprises a second classifying means 601 and comparing means 603. The second classifying means 601 receives as input the clusters identified by the identifying means 203 and fresh data from the firewall log 109, and the comparing means 603 receives as input the rare pairings 215. As stated above, once clusters and rare pairings 215 have been identified, the processing means 207 will perform real-time analysis of incoming packets.

Figure 7:
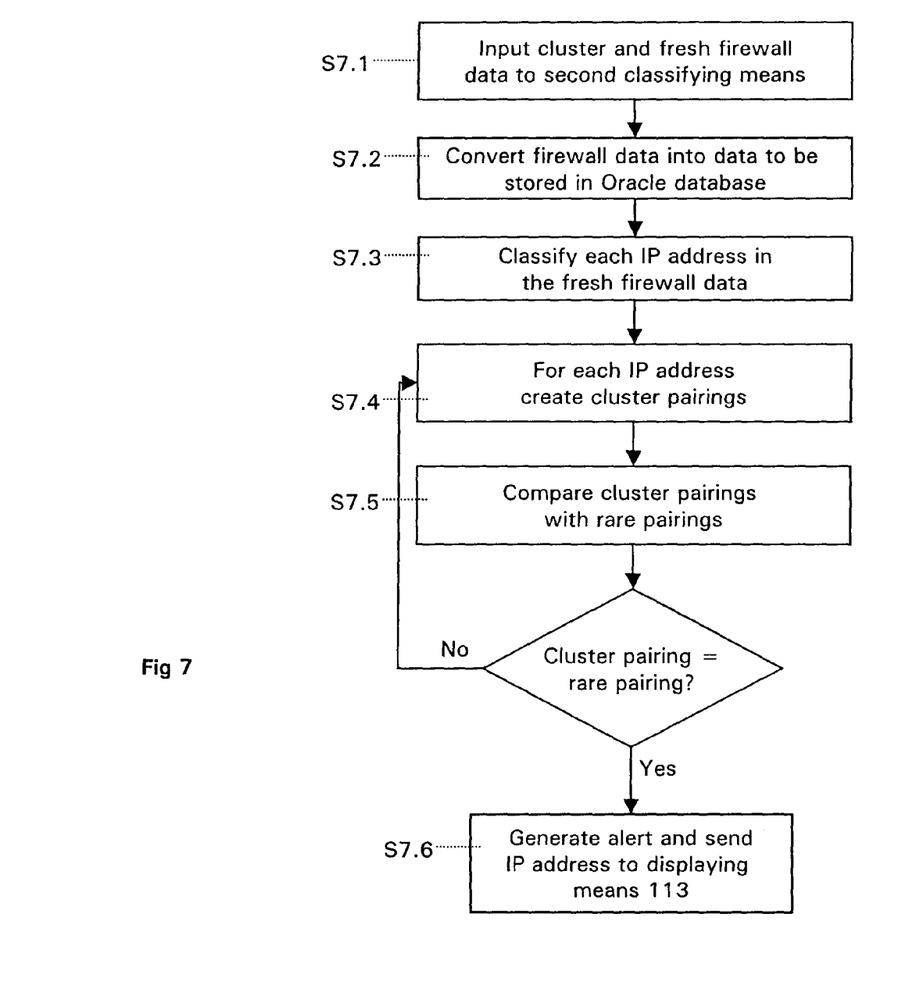
FIG. 7 is a flow diagram showing the processes carried out by components of the processing means of FIG. 6.

These components inter-operate in the manner shown in FIG. 7:

S 7.1 Clusters determined at S 4.4 and fresh firewall data 217, which is data received by the firewall within a predetermined time period and passed to processing means 207 after writing to the firewall log 109, are input to second classifying means 601;

S 7.2 Format converter 600*a* converts and stores fresh firewall data in Oracle Tables 600*b*;

S 7.3 The second classifying means 601 classifies each of the IP addresses in the firewall data 217 into one of the determined clusters for that time period (as per S 4.5). This occurs by performing a factor analysis for each IP address, then comparing the factor values with the cluster conditions detailed in Table 2.

Thus, for the following example:

| IP address | Factor1 | Factor2 | Factor3 | Factor4 | Factor5 | Factor6 | Factor7 | Factor8 | Cluster |
|---|---|---|---|---|---|---|---|---|---|
| 0.0.0.1 | 526.6 | 0 | 0 | 0 | 128 | 0 | 0 | 0 | B |

(NB: for Factor 1, a mean packet length is calculated from the field data comprising Factor 1; units are Bytes)

Cluster classification may be determined in accordance with cluster order—in FIG. 5, determining which "disc" the IP address falls onto:

The first cluster to be checked for is A. Is factor 8>0? NO

Next cluster to be checked for is B. Is factor 5>0 and factor 6=0? YES

However, note that factor 1 is non-zero (and cluster B is quiet wrt values for factor 1). This factor can be ignored, because the clusters created as described above are characterised by specific combinations of factors (in this case cluster B is characterised by factors 5 and 6), and are insensitive to contributions from other factors (unless those contributions fall within the specific factor definition of a cluster). Thus IP address 0.0.0.1 is classified by cluster B.

Alternative methods for classifying IP addresses into clusters are discussed below.

S 7.4 Once two or more time periods have passed, create cluster pairings for each IP address. Note that if an IP address is active in period 1, say, and for example is classified as cluster A for that period, then if it was not mentioned in the firewall data for period 2, it would be put in cluster Z for period 2. So the IP address cluster will change from A to Z, and its cluster pairing would be AZ;

S 7.5 For each IP address, compare the cluster pairings created at S 7.1 with the rare pairings 215.

S 7.6 If any of the cluster pairings is one of the rare pairings, send an alert to the displaying means 113, together with the IP address corresponding to this cluster pairing.

For data received at a particular firewall, Table 4 shows cluster information for a sample of IP addresses that have been identified by processing means 207 as including rare pairings during time periods 12–13 (each time period includes 2 hours of data):

TABLE 4

| IP address | Cluster history for past 24 hours | Current cluster | Change between clusters that generate an alert: rare pairings |
|---|---|---|---|
| 198.133.219.25 | NZANABHCHAAA | H | ftp + telnet receiver- > receives lots of http (A–H) |
| 195.115.11.237 | GGGGGBEBEEGE | G | http sender- > large receiver (E–G) |
| 147.151.167.219 | EZZNNCZZZNDD | B | ftp + telnet sender- > icmp receiver (D–B) |
| 147.151.166.49 | ZZZZZZZZZZZZD | B | ftp + telnet sender- > icmp receiver (D–B) |

As described with reference to FIG. 4 above, rare cluster pairings are derived from data received at a firewall by identifying means 203. In this example, cluster pairings A–H, E–G and D–B have been identified to be rare pairings.

The volume of information that is output to the displaying means 113 is likely to be less than the volume that is output using conventional methods (described above). Furthermore, this method removes the need to specify rules for different types of traffic, different types of attacks etc. as it identifies any changes in behaviour per se.

Alternative Embodiment

In the embodiment above, a cluster is described as being characterised by one or more factor. Referring to Table 1, each of the factors describe a particular type of behaviour, such that when a cluster is characterised by more than one factor, IP addresses falling within the cluster have more than one type of behaviour. This is to be expected from computers that run multiple applications and send and receive packets on a network, particularly given that the majority of machines can multi-task (e.g. different traffic types, services).

As an alternative to the clustering described above, a single cluster could be assigned to each factor, so that, in a given time period, an IP address may appear in more than one cluster. The evaluation of cluster changes between time periods would then involve analysis of changes between multiple clusters, rather than between single clusters, as is described above.

e.g.

| IP Address | Clusters at $t_0$ | Clusters at $t_1$ |
|---|---|---|
| 0.0.0.2 | A, B, N | A, B |

The analysis of cluster changes, in order to isolate infrequently occurring (rare) changes, will thus involve more processing in this embodiment.

The clusters formed according to the first embodiment do not facilitate analysis of the behaviours within a time period, whereas this embodiment presents a breakdown of the component behaviours, and enables additional time-independent analysis of network activity. This embodiment could thus be important if a particular combination of clusters within a time period, or a combination of clusters in a particular order, is distinctive of a particular behaviour (e.g. a "signature" of a hacker).

Assigning a cluster to each factor thus has the benefits of increased visibility of IP address behaviour, but at the expense of additional computational time. However, in the area network security, which is extremely important to an organisation, the benefits of this approach may justify the additional processing required.

The invention could provide useful information in the following situations:

A common technique employed by hackers is to log onto different machines and to hack onto a site from each of those machines. Often University machines are used, as creation, use and deletion of user accounts is poorly administered. If similar patterns of behaviour are identified from a number of different IP addresses, then this could indicate that there is in fact a single hacker attempting access from a range of different machines. If, for a few IP addresses, changes in clusters appear to occur in a particular sequence, then this could be indicative of behaviour of a single hacker, rather than of individual users. This sort of analysis could also be useful in detecting "denial of service attacks", where multiple sources send multiple packets to a small number of machines;

Some companies administer firewall systems for a number of, and different types of, customers. Nominally the firewall administrating company provides a very similar firewall arrangement ("solution") for each customer (i.e. components, arrangement of components), while each of the firewall systems is maintained and monitored independently of another firewall system. A hacker, who knows that the infrastructure is the same, may launch a series of attacks against more than one firewall system. If a rare event detector 201 were in co-operation with each of the firewall systems, then the clustering information could be compared between systems, and analysed for similar behaviour (e.g. one IP address attempting to attack all of the firewall systems).

Virtual Private Networks (VPN) are increasingly being used as a cost effective means of building and deploying private communication networks for multi-site communication (i.e. compared to dedicated WANS, and dial networks). In general, customers using VPNs require some form of data security, as the customer's VPN traffic is transported on an IP backbone alongside other, unrelated, traffic. Typically, suitable security includes firewall functionality and secure packet transport services. Customers with private networks already have a plurality of Customer Premises Equipment (CPE), including firewall systems, routers etc. It is therefore convenient for a VPN manager (either customer or ISP) to make use of this existing infrastructure, adding functionality to the CPEs in accordance with the particular VPN security policy. Thus in addition to the monitoring of network events discussed hereinabove in relation to a private network, additional monitoring, in respect of traffic bound for devices comprising a VPN, may be carried out. Network-based VPN, where operation of the VPN is outsourced to an ISP, and is implemented on network equipment, and thus does not make use of CPE equipment. Thus, rather than running the invention in parallel with an existing firewall system, it could co-operate with any component of network equipment, or a combination of network components, that together receive VPN traffic.

Alternatives and Additional Details

Other Clustering Techniques

The term cluster analysis actually encompasses a number of different classification algorithms, which are concerned with organising observed data into meaningful structures. Cluster analysis methods are mostly used when there is no a priori hypothesis, so that, in a sense, cluster analysis finds the "most significant solution" possible. Well-known techniques include tree clustering, which uses the dissimilarities, or distances between objects, when forming the clusters. These distances can be based on a single dimension or multiple dimensions. One way of computing distances between objects in a multi-dimensional space, such as the 8-dimensional factor space of the embodiment described above, is to compute Euclidean distance, which is the actual geometric distance between objects in the space (i.e., as if measured with a ruler).

Other Methods of Mapping IP Addresses into Clusters

As described above, the behaviour of an IP address is analysed into factors, and the value of these factors are used to decide which cluster the IP address falls into. The method described above performs a hierarchy-based analysis. The following are alternative approaches:

Match the factors that characterise the IP address against the factors that characterise each cluster; the cluster whose factors most closely match those of the IP address classifies the IP address;

Re-form the clusters, assuming that each factor can be related to a cluster in the following manner:

For a single condition cut-off:
  1 factor: If factor1>x then cluster A else cluster B,
  2 factors If factor1>x and factor2>y then A
    If factor1>x and factor2<(y+1) then B
    If factor1<(x+1) and factor2>y then C
    If factor1<(x+1) and factor2<(y+1) then D, etc.

where x and y are discrete values for factors. With 8 factors there are potentially 256 clusters. These clusters could then be merged together, based on levels of correlation between the clusters (i.e. if characteristics of one cluster are correlated with characteristics of another cluster, then only one cluster is required). The cut-off conditions are essentially step functions, which is consistent with the assumption that an IP address is in one cluster only (so that the behaviour of the IP addresses is perfectly matched by the clusters identified by the identifying means 203). It may be the case that interaction between clusters becomes less discrete, in which case the cut-off condition may be described by a functional relationship. Furthermore, there may also be multiple conditions for each factor e.g.

If factor1>x and factor2>y then A
If factor1<p and factor2>y then E

Use Triples of Clusters, as Well as, or Instead of, Cluster Pairings

The embodiment described above organises the cluster data into cluster pairings, and performs analysis on the frequency of occurrence of cluster pairings. However, the cluster data could alternatively be organised into cluster triples—i.e. 3 consecutive clusters, and the frequency of occurrence of combinations of cluster triples then analysed.

Furthermore, the embodiment forms conditions based on adjacent cluster pairings. It may be that a hacking attack does not fall within the time periods of the firewall log—the behaviour may comprise actions that occur more than one time period apart. In this case, patterns of clusters other than consecutive cluster pairings or triples should be analysed.

Minimum Data Set to Create Rare Event Criteria

The method described above makes use of 3 days i.e. 72 hours of data, arranged in 3×12×2 hour periods, to identify rare event criteria. A minimum amount of data is likely to include data from at least three 12-hour periods. Preferably, the method is applied to more than one set of three 12-hour periods, and the factors and clusters identified for each set compared with one another.

Validation of Rare Event Criteria

As stated above, a firewall system is designed to operate within the Internet environment, which is continually being re-shaped by the introduction of new applications and protocols. It is therefore likely that the rare event criteria determined at a firewall will change, possibly with a timescale that is itself dynamic. As a result, the method described above is preferably carried out regularly.

Processing Methods

The method described above includes processing of fresh data as the data arrives in the firewall log. However, the incoming data could be stored for batch processing.

Different Fire Wall Systems

The rare event detector 201 is described above with reference to data received at a single firewall system. However, the Internet space comprises millions of different private networks, each utilising different services and receiving/sending different types of data. Thus rare event criteria for one private network could be expected to differ substantially from rare event criteria for any other private network. A rare event detector 201 would therefore preferably co-operate with each firewall system independently, and generate customised rare event criteria corresponding thereto.

Association Rules

There may be links between particular types of attacking behaviour, e.g. if a hacker attempts to attack a network using protocol X in a particular manner then the hacker is likely to try protocol Y next. If such associations exist, identifying the association between hacking techniques can enable proactive monitoring of network attacks. In order to perform such proactive monitoring, the comparing means 603 could include means for checking whether analysed cluster pairings fall within cluster pairing conditions that define association rules, and if so, to examine subsequent cluster pairings corresponding to that IP address, to see whether these follow the expected subsequent parts of the association.

Other Applications of the Rare Event Detector

The present invention detects changes in behaviour of IP addresses and has many applications, besides that of intrusion detection, within a network environment (wireless or wired). The rare event detector could be integrated into a network management system, and used to monitor the performance of network devices; e.g. if a device fails, its behaviour could be expected to change, and this will be identified by changes in cluster pairings ("fail" in this context includes failure of a device to provide a required quality of service, due to, e.g. memory leaks, overloading CPU etc.)

Implementation Details (Not Shown)

Analysis of the fields into factor and cluster information by identifying means 203 and processing means 207 is preferably carried out using a programming language that is an integral part of the SAS statistical package. The clusters and rare pairings established at S 4.4 and S 4.6.5 are stored in Oracle tables. A shell script is preferably used to co-ordinate the processes described in FIG. 7 above, and the fresh firewall data, once converted into Oracle tables (S 7.2) is stored, together with the rare pairings and clusters, and manipulated on a server machine. Web pages are generated from a PL/SQL query using Oracle's Web Application Server, which enables visualisation of information relating to IP addresses (described in more detail below) in a web browser located on a client machine.

The scripts, database and Oracle Web Application server could be located on a single remote machine, such that the scripts are invoked using Telnet from client terminals, or the database could be located on a database server ("third tier"), with the Oracle Web Application server and scripts being located on a middle tier, receiving input from a client terminal.

As stated above with reference to FIG. 1, displaying means 113, which receives the alert data, is located on a different sub-net from the rare event detector 201, as it typically receives data from a plurality of rare event detectors 201, and therefore preferably provides centralised responses to alert messages.

Figure 8:
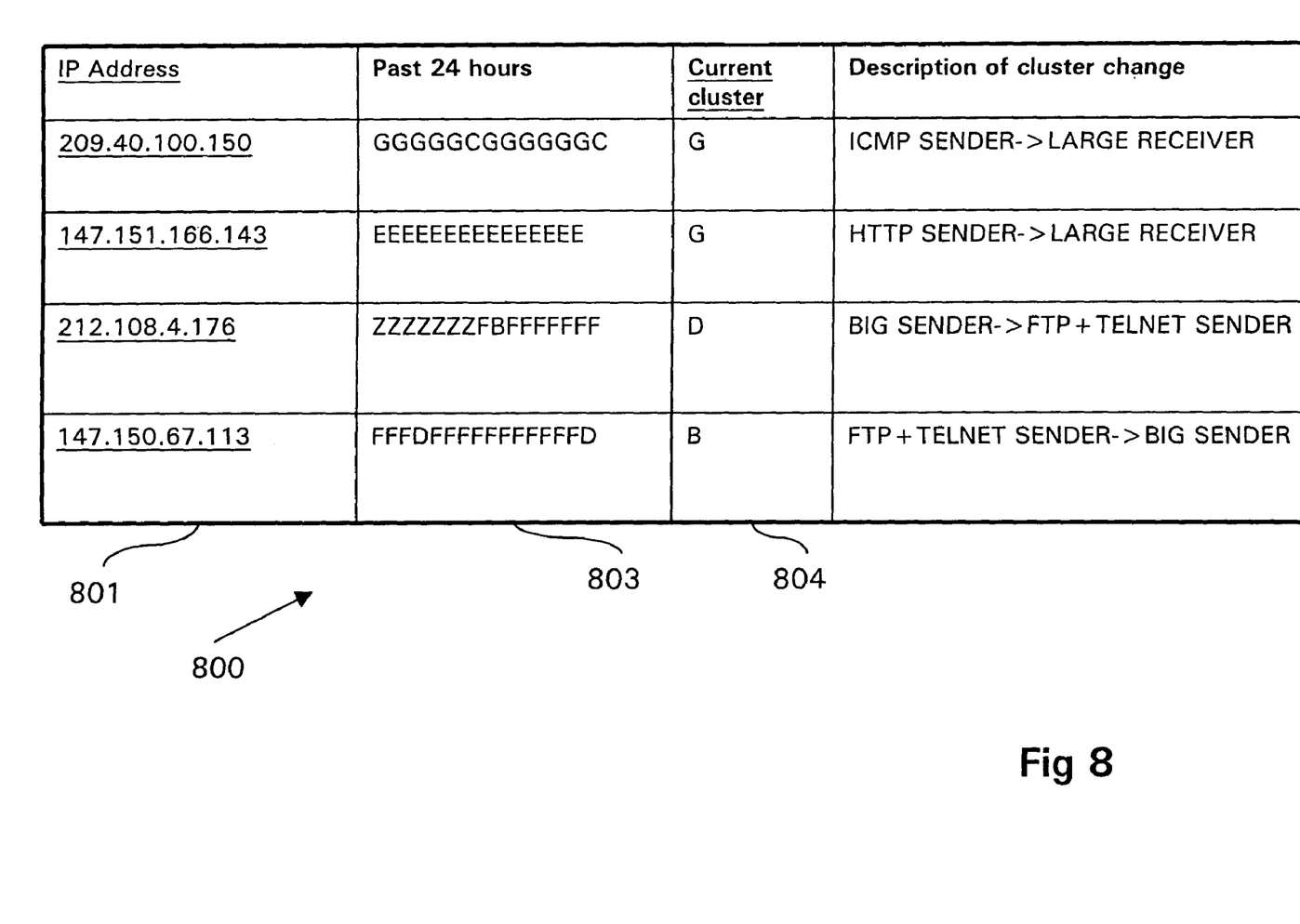
FIG. 8 is an example of the output generated from the processing means of FIG. 3.

Displaying Results:

As well as providing an alert to the displaying means 113, the processing means 207 preferably includes means for drilling down for each analysed IP address; most preferably the information is presented in an .html page 800, as shown on FIG. 8, using Oracle's Web Application Server, enabling IP addresses and clusters to be inter-related. Nominally the information is displayed as cluster history 803, and current cluster 804 as a function of IP address 801. In order to see more information about an IP address, the user can select an IP address in the list 801. This action causes a further web page to be displayed (not shown), which details all IP addresses that the selected IP address has sent information to, or received information from (that were recorded in the firewall log, so IP addresses within the private network). Furthermore, the factors pertaining to each of the IP addresses can be displayed (also not shown).

As will be understood by those skilled in the art, the invention described above may be embodied in one or more computer programs. These programmes can be contained on various transmission and/or storage mediums such as a floppy disc, CD-ROM, or magnetic tape so that the programmes can be loaded onto one or more general purpose computers or could be downloaded over a computer network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

ANNEX 1

TABLE 1

| SAS Variables extracted from firewall data, using fields | F1 | F2 | F3 | F4 | F5 | F6 | F7 | F8 |
|---|---|---|---|---|---|---|---|---|
| No. packets sent to IP address | | | | | | | | |
| No. TCP packets sent to IP address | | | | | | | | |
| No. FTP packets sent to IP address | | | | | | | | • |
| No. HTTP packets sent to IP address | | | | • | | | | • |
| No. Telnet packets sent to IP address | | | | | | | | • |
| No. ICMP packets sent to IP address | | | | | • | | | |
| No. UDP packets sent to IP address | | | | | | | | |
| No. IP source packets sent to the IP address from | | | | | | | | |
| No. ports packets sent to the IP address from | | | | | | | | |
| Time between first and last packets sent to IP address | | | | | | | | |
| Min length of packet sent to IP address | | • | | | | | | |
| Max length of packet sent to IP address | | • | | | | | | |
| No. packets sent to IP address that were accepted by firewall | | | | | | | | |
| No. packets sent by IP address | | | | • | | | | |
| No. TCP packets sent by IP address | | | | | | | | |
| No. FTP packets sent by IP address | | | | | | | • | |
| No. HTTP packets sent by IP address | | | | | | • | | |
| No. Telnet packets sent by IP address | | | | | | | • | |
| No. ICMP packets sent by IP address | | | | | | • | | |
| No. UDP packets sent by IP address | | | • | | | | | |
| No. IP source packets sent to by the IP address | | | • | | | | | |
| No. ports packets sent to by the IP address | | | • | | | | | |
| Time between first and last packet sent by the IP address | | | | | | | | |
| Min length of packet sent by the IP address | | | • | | | | | |

TABLE 1-continued

| SAS Variables extracted from firewall data, using fields | F1 | F2 | F3 | F4 | F5 | F6 | F7 | F8 |
|---|---|---|---|---|---|---|---|---|
| Max length packet sent by the IP address | | | | | | ● | | |
| No. packets sent by IP address that were accepted by firewall | | | | | | | | |

NOTE:

F1 to F8 are factors; each factor is characterised by a selection of fields, for instance F7 is characterised by No. FTP packets sent, No. Telnet packets sent, by an IP address. The selection of fields to characterise factors is driven by output from the SAS program: SAS returns values for all of the fields, for each factor, and the fields having the most significant (largest) values are selected to characterise a factor. When some of the field values are of a similar orderfor a factor, "the most significant values" are preferably selected using statistical techniques such as probability functions in order to provide statistical confidence in their selection.

TABLE 2

| CLUSTER | DISTINGUISHING FACTOR | DESCRIPTION | CONDITION (see note 1 at bottom of table) | No. IP ADDRESSES WITHIN CLUSTER (of a 1% sample, selected at random) |
|---|---|---|---|---|
| A | 8 | FTP and/or Telnet receiver | F8 > 0 | 49 |
| B | 5, 6 | ICMP receiver | (F8 > 0) F5 > 0, F6 = 0 | 221 |
| C | 6 | ICMP sender | (F8 > 0, F5 > 0) F6 > 0 | 184 |
| D | 7 | FTP and/or Telnet sender | (F8 > 0, F5 > 0) F6 = 0, F7 > 0 | 21 |
| E | 4 | HTTP sender | (F8 > 0, F5 > 0, F6 = 0, F7 > 0) F4 > 0 | 157 |
| F | 2 | Sends a lot of packets | (F8 > 0, F5 > 0, F6 = 0, F7 > 0, F4 > 0) F2 > 250 packets | 10 |
| G | 1 | Receives a lot of packets | (F8 > 0, F5 > 0, F6 = 0, F7 > 0, F4 > 0, F2 > 250 packets) F1 > 125 Bytes | 62 |
| H | 3 | Receives a lot of HTTP | (F8 > 0, F5 > 0, F6 = 0, F7 > 0, F4 > 0, F2 > 250 packets, F1 > 125 Bytes) F3 > 64 | 18 |
| N | — | Normal | F8 = 0, F5 = 0, F6 = 0, F7 < 0, F4 < 0, F2 < 251 packets, F1 < 126 Bytes, F3 < 65 | 1543 |
| Z | — | Asleep | IP addresses that are inactive during a time period | |

NOTE 1:

Each cluster essentially adds a condition (conditions in bold typeface); referring to FIG. 5, the conditions in bold typeface are represented by difference in internal diameter between discs. As cluster A has the largest internal diameter (hole), it is characterised by the least number of factor conditions; as the disc internal diameters decrease, the number of factor conditions characterising the disc increase. However, because the outer diameters of all discs are the same, the IP addresses that fall on discs higher up the disc hierarchy would also, if those higher discs were removed, fall on at least one of the discs below the removed disc. This is represented by the conditions in non-bold typeface.

What is claimed is:

1. A method of analyzing network events on the basis of data in respect of processed network traffic events, each data data item identifying attributes thereof, the attributes including at least a time at which a respective network traffic event was processed and a network address identifying a network device from and/or to which packets were sent,
   (i) evaluating a correlation between attributes of the received data so as to identify groups of attributes that meet a correlation criterion;
   (ii) for those groups that meet the correlation criterion, replacing the attributes in the group with a factor representative thereof;
   (iii) identifying clusters of factors from at least some of the processed network traffic event data;
   (iv) identifying time intervals, and assigning each of the data items to a time interval in accordance with that data item's associated time value;
   (v) for each time interval, for each value of network address attribute in the data, categorizing the data items corresponding thereto into one of the clusters;
   (vi) for each value of network address attribute in the data, identifying pairs of time intervals so as to generate a plurality of pairs of clusters;
   (vii) for each possible cluster pairing, counting the number of occurrences thereof, and identifying any cluster pairings for which the number of occurrences is less than a predetermined number.

2. A method according to claim 1, in which a series of three time intervals are identified so as to generate a plurality of series of three clusters, and in which the number of occurrences of series of three clusters is counted.

3. A method according to claim 1 in which each pair of time intervals or series of three time intervals overlaps with the last pair of time intervals or series of three time intervals.

4. A method according to claim 1, in which the at least some processed network traffic event data used to identify clusters of factors is selected at random from the data.

5. A method according to claim 1, in which a time interval in a pair of time intervals or in a series of three time intervals is separated from a next time interval in the pair or series of three time intervals, so that the next time interval in the pair or in the series of three time intervals are not consecutive.

6. A method according to claim 1 further including classifying input network events on the basis of factors generated, the classification including:
   identifying the values of the network address attribute corresponding to the input network events
   assigning the input network events to a time interval in accordance with that event's associated time value; and
   for each time interval, for each network address attribute categorizing the input network events into one of the clusters;
   pairing each cluster with a previously categorized cluster corresponding to the identified network address value falling within a previous time interval;
   comparing the pairing with the identified cluster pairings, and, if the said pairing is one of the identified cluster pairings, classifying the input network event as a rare network event.

7. A method according to claim 6, including generating an alert in response to the input network event being classified as a rare event.

8. A computer program, or a suite of computer programs, comprising a set of instructions to cause a computer, or a suite of computers, to perform the method steps according to claim 1.

9. A method according to claim 1 in which a time interval in a pair of time intervals or in a series of three time intervals is consecutive with a next time interval in the pair or series of three time intervals.

10. Firewall apparatus for use in identifying unauthorized attempts to access a private network, said apparatus comprising:
    storage arranged to store data in respect of processed network traffic events, each data item identifying, attributes thereof, the attributes including at least a time at which a respective network traffic event was processed and a network address identifying a network device from and/or to which packets were sent,
    a correlator arranged to evaluate a correlation between attributes of the received data so as to identify groups of attributes that meet a correlation criterion;
    means arranged to replace attributes in a group with a factor representative thereof; means
    arranged to identify clusters of factors from at least some of the processed network traffic event data;
    assigning means arranged to assign each of the data items to a time interval in accordance with that data item's associated time value;
    clustering means arranged to categorize the data items, for each time interval, for each value of network address attribute into one of the clusters;
    processing means arranged to identify for each value of network address attribute in the data, pairs of time intervals so as to generate a plurality of pairs of clusters; and
    means arranged to count the number of occurrences of cluster pairings, and identify any cluster pairings for which the number of occurrences is less than a predetermined number.

11. Firewall apparatus according to claim 10, in which the processing means is arranged to identify series of three time intervals so as to generate a plurality of cluster triples, and in which the count means is arranged to count occurrences of cluster triples.

12. Firewall apparatus according to claim 10, in which each pair of time intervals or series of three time intervals overlaps with a last pair of time intervals or series of three time intervals.

13. Firewall apparatus according to claim 10, in which the clustering means is arranged to select at least some processed network traffic event data used to identify clusters of factors at random from the data.

14. Firewall apparatus according to claim 10, in which a time interval in a pair of time intervals or in a series of three time intervals is consecutive with a next time interval in the pair or series of three time intervals.

15. Firewall apparatus according to claim 10, in which a time interval in a pair of time intervals or in a series of three time intervals is separated from a next time interval in the pair of series of three time intervals, so that the next time interval in the pair or in the series of three time intervals are not consecutive.

16. Firewall apparatus according to claim 10 further including classifying means for classifying input network events on the basis of factors generated, the classifying means arranged to identify the values of the network address attribute corresponding to the input network events;

assign the input network events to a time interval in accordance with that event's associated time value; and for each time interval, for each network address attribute categorize the input network events into one of the clusters;

pairing means for pairing each cluster with a previously categorized cluster corresponding to the identified network address value falling within a previous time interval;

comparing means for comparing the pairing with the identified cluster pairings, and, if the said pairing is one of the identified cluster pairings, classifying the input network event as a rare network event.

17. Firewall apparatus according to claim 16 including means for generating an alert in response to the input network event being classified as a rare event.

18. A computer program, or a suite of computer programs, comprising a set of instructions on a computer readable medium to cause a computer, or a suite of computers, to perform the method steps according to claim 1.

* * * * *